United States Patent
Li et al.

(10) Patent No.: US 11,908,140 B1
(45) Date of Patent: Feb. 20, 2024

(54) METHOD AND SYSTEM FOR IDENTIFYING PROTEIN DOMAIN BASED ON PROTEIN THREE-DIMENSIONAL STRUCTURE IMAGE

(71) Applicant: ZHEJIANG LAB, Zhejiang (CN)

(72) Inventors: Jingsong Li, Hangzhou (CN); Jing Ma, Hangzhou (CN); Yu Wang, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/364,469

(22) Filed: Aug. 2, 2023

(30) Foreign Application Priority Data

Oct. 9, 2022 (CN) .......................... 202211226272.4

(51) Int. Cl.
*G06T 7/00* (2017.01)
*G06T 7/11* (2017.01)

(52) U.S. Cl.
CPC .............. *G06T 7/0014* (2013.01); *G06T 7/11* (2017.01); *G06T 2207/10028* (2013.01); *G06T 2207/20081* (2013.01)

(58) Field of Classification Search
CPC ..................... G06T 7/0014; G06T 7/11; G06T 2207/10028; G06T 2207/20081
See application file for complete search history.

(56) References Cited

U.S. PATENT DOCUMENTS

| | | | | |
|---|---|---|---|---|
| 11,256,995 B1 * | 2/2022 | Bucher | ................... | G06N 5/022 |
| 2005/0042598 A1 * | 2/2005 | Hill | ........................ | B82Y 15/00 |
| | | | | 435/5 |
| 2016/0108380 A1 * | 4/2016 | Iavarone | .............. | C07K 14/435 |
| | | | | 536/23.2 |
| 2017/0103521 A1 * | 4/2017 | Chukka | ................. | G06V 20/695 |
| 2021/0027860 A1 * | 1/2021 | Zhang | .................... | G16B 15/20 |
| 2021/0174903 A1 * | 6/2021 | Rothberg | ............... | G16B 30/10 |
| 2021/0304847 A1 * | 9/2021 | Senior | .................... | G16B 15/20 |

(Continued)

FOREIGN PATENT DOCUMENTS

| | | |
|---|---|---|
| CN | 107622182 A | 1/2018 |
| CN | 108549794 A | 9/2018 |

(Continued)

OTHER PUBLICATIONS

Notice Of Allowance(CN202211226272.4); dated Dec. 15, 2022.

(Continued)

*Primary Examiner* — Van D Huynh

(74) *Attorney, Agent, or Firm* — W&G Law Group

(57) ABSTRACT

Disclosed is a method and system for identifying a protein domain based on a protein three-dimensional structure image. According to the present application, the protein domain is identified based on a structure similarity, the identification errors and omissions of the protein domain caused by protein multi-sequence alignment errors when sequence consistency is not high can be effectively solved. According to the present application, the point cloud segmentation model based on the dynamic graph convolutional neural network is constructed, and by integrating global structural features and local structural features, segmentation of the protein domain and acquisition of semantic labels of the protein domain can be completed at the same time.

9 Claims, 8 Drawing Sheets

(56) References Cited

U.S. PATENT DOCUMENTS

2022/0406403 A1* 12/2022 Singh .................. G16B 40/20
2023/0207064 A1*  6/2023 Hamp .................. G06N 3/08
                                              706/12

FOREIGN PATENT DOCUMENTS

| CN | 109300501 A | 2/2019 |
| CN | 109817276 A | 5/2019 |
| CN | 110853703 A | 2/2020 |
| CN | 112233723 A | 1/2021 |
| CN | 112289370 A | 1/2021 |
| CN | 112364983 A | 2/2021 |
| CN | 112488210 A | 3/2021 |
| CN | 112767997 A | 5/2021 |
| CN | 112837741 A | 5/2021 |
| CN | 113192559 A | 7/2021 |
| CN | 113223608 A | 8/2021 |
| CN | 113537143 A | 10/2021 |
| CN | 114631150 A | 6/2022 |
| CN | 114649053 A | 6/2022 |
| CN | 114792372 A | 7/2022 |
| CN | 114974397 A | 8/2022 |
| WO | 2020058174 A1 | 3/2020 |
| WO | 2022166400 A1 | 8/2022 |

OTHER PUBLICATIONS

First Office Action(CN202211226272.4); dated Dec. 8, 2022.
Research-on-3D-point-cloud-Segmentation-Algorithm-based-on-graph-attention-convolutional-neural-network Mechanical translation 2021.
research-on-3d-point-cloud-recognition-based-on-graph-convolutional-network, 2020.
Protein-Ensemble-Learning-with-Atrous-Spatial-Pyramid-Networks-for-Secondary-Structure-Prediction, 2020.
A-Segmentation-Based-Method-to-Extract-Structural-and-Evolutionary-Features-for-Protein-Fold-Recognition, 2014.

* cited by examiner

METHOD AND SYSTEM FOR IDENTIFYING PROTEIN DOMAIN BASED ON PROTEIN THREE-DIMENSIONAL STRUCTURE IMAGE

CROSS-REFERENCE TO RELATED APPLICATIONS

The present application claims priority to Chinese Patent Application No. 202211226272.4, filed on Oct. 9, 2022, the content of which is incorporated herein by reference in its entirety.

TECHNICAL FIELD

The present application belongs to the technical field of medical information, in particular to a method and a system for identifying a protein domain based on a protein three-dimensional structure image.

BACKGROUND

The competition of international drug research mainly focuses on the research of drug targets, which plays an extremely important role in drug development and reuse and is a very arduous task. Once the target is drug-forming, a series of candidate drugs will enter the clinical screening stage, which will have a great impact on the treatment of related diseases. There are more than 100,000 kinds of protein in human body, of which about 8,000 are potential drug target proteins. At present, only about 500 protein drug targets have been found. It is generally believed that the interaction between drug and target is mediated by the interaction between drug and protein domain. Since protein has a modular structure, and the same domain can be found repeatedly in different protein, a drug can bind to multiple protein targets, which may be related to the drug targeting protein with the same domain, or it may be an important factor of multiple pharmacological effects of most drugs. Therefore, it is very important to accurately identify the domain of protein, which is very important for understanding the mechanism of drug action and designing new drugs that can combine with these therapeutic targets. At present, many methods have been developed to determine the protein domain from the amino acid sequence of protein. These methods can be roughly divided into four categories: template-based methods, ab initio calculation methods, methods based on homologous protein templates and ab initio calculation, and meta-domain prediction.

Although protein's amino acid sequence determines the structure of protein, with the development of biological sequence pattern and feature knowledge, the shortcomings of protein's amino acid sequence alignment gradually appear. First of all, its premise is that homologous protein amino acid sequences are extended from a series of linear and conservative sequences, but this assumption of collinearity is often violated in the real world. Secondly, when the consistency of amino acid sequence in protein is lower than a certain critical point, the accuracy of amino acid sequence alignment in protein drops rapidly. In practical application, the region with 20-35% amino acid sequence consistency in protein is usually considered as a "transition zone", in which remote homologous sequences are mixed with random sequences. The regions with less than 20% amino acid sequence identity in protein cannot be reliably identified by simple sequence alignment. This problem is particularly prominent in the annotation of protein's superfamily, because the protein amino acid sequence among superfamily members is 8-10% identical, but they still maintain the structural kinship, that is, the three-dimensional structure of protein is similar. Furthermore, accurate multi-sequence alignment calculation is a NP-hard problem, and its time complexity is very high (the product of the length of the input protein amino acid sequence). Any speed optimization strategy sacrifices the identification of the optimal and highest scores, which often leads to inaccuracy and limits the quality of many downstream analyses.

The three-dimensional structure analysis of protein has always been a difficult point in structural biology, but recently, Alphafold2 and others can accurately predict the three-dimensional structure of protein through the protein amino acid sequence by using the deep neural network learning algorithm, which is close to the level of experimental determination (the accuracy is over 90%). Although these predicted protein three-dimensional structures can't completely replace the protein experimental structure, they have achieved high accuracy in basic morphological folding due to their high relative accuracy. Even with such a high-precision protein, the information of protein domain is still unclear.

SUMMARY

The object of the present application is to provide a method and a system for identifying a protein domain based on protein three-dimensional structure image, aiming at the shortcomings of the traditional analysis method for predicting protein domain based on protein amino acid sequence. Since the structures of the same domain have great similarity, the present application integrates the global structural features and local structural features of protein three-dimensional structure based on protein three-dimensional structure image and dynamic graph convolutional neural network, and constructs a point cloud segmentation model to identify the domain composition of the protein.

The object of the present application is achieved through the following technical solutions.

According to the first aspect of this specification, there is provided a method for identifying a protein domain based on a protein three-dimensional structure image; the method includes the following steps:

S1, data acquisition and preprocessing, including: obtaining protein information, protein domain annotation information, a protein three-dimensional experimental structure, a protein three-dimensional computational structure and protein secondary structure annotation information;

S2, generation of a training set, including: extracting three-dimensional coordinates of carbon, nitrogen and oxygen atoms in a main chain from the protein three-dimensional experimental structure to construct three-dimensional atomic point cloud, and after standardized preprocessing, giving each atomic point a semantic label of the protein domain to which each atomic point belongs, so as to form the protein three-dimensional structure image as the training set;

S3, generation of a target set, including: extracting three-dimensional coordinates of carbon, nitrogen and oxygen atoms in a main chain from the protein three-dimensional computational structure to construct three-dimensional atomic point cloud, and after standardized preprocessing, forming the protein three-dimensional structure image as the target set;

S4, construction of a point cloud segmentation model, including: constructing, by the atomic points in the protein three-dimensional structure image, a local directed graph according to a K-nearest neighbor classification algorithm; and constructing the point cloud segmentation model based on a dynamic graph convolutional neural network according to the local directed graph.

Further, in step S4, the point cloud segmentation model includes a local feature extraction layer, a global feature extraction layer and a segmentation layer; the protein three-dimensional structure image is inputted into the point cloud segmentation model after feature extraction, local features are extracted through the local feature extraction layer, global features are extracted through the global feature extraction layer, and the local features and the global features are integrated through the segmentation layer to output a score of a protein domain category label of each atomic point;

S5, training of the model: extracting features of the protein three-dimensional structure image in the training set, and then training the point cloud segmentation model; and S6, prediction of the model: identifying the protein domain of the target set after feature extraction by using the trained point cloud segmentation model.

Further, S1 specifically includes the following sub-steps.

Extracting the protein information of all species from a protein database.

Extracting the protein domain annotation information of all species from a protein family and structural domain database.

Extracting the protein three-dimensional experimental structure from a protein three-dimensional experimental structure database.

Predicting the protein three-dimensional computational structure by using a protein three-dimensional structure prediction tool, or extracting the protein three-dimensional computational structure from the protein three-dimensional computational structure database.

Annotating a protein secondary structure extracted from the protein database by using a protein secondary structure annotation tool.

Further, in S2, according to chain annotation information of the protein three-dimensional experimental structure, other chains or solvents in the protein three-dimensional experimental structure are removed, and the three-dimensional coordinates of the remaining carbon, nitrogen and oxygen atoms in a main chain in the protein three-dimensional experimental structure are extracted to construct the three-dimensional atomic point cloud.

Further, standardized preprocessing of the three-dimensional atomic point cloud specifically is: firstly, transferring all atomic points to a local coordinate system with a geometric center as an origin, and then normalizing these atomic points into a unit sphere.

Further, point cloud features of the atomic point of the protein three-dimensional structure image include, but not limited to: three-dimensional coordinates of the atomic point after standardized preprocessing, a relative sequence of amino acid to which the atomic point belongs in protein, an atomic type, secondary structure annotation information of the amino acid to which the atomic point belongs, and angles formed between the atomic point and the adjacent atomic points before and after thereof; the atomic type includes α carbon, other carbon, oxygen and nitrogen; the secondary structure annotation information includes α-helix, β-sheet and random coil; and the relative sequence and the angles are all normalized.

Further, in the point cloud segmentation model, the local feature extraction layer is composed of a plurality of edge-connected convolutional layers which are sequentially connected, and each edge-connected convolutional layer inputs a local directed graph feature of each atomic point and outputs the local feature of each atomic point after an edge-connected convolutional operation; an output of the previous edge-connected convolutional layer serves as an input of the next edge-connected convolutional layer.

The global feature extraction layer is composed of a multi-layer perceptron and a pooling layer, the local features of the atomic points outputted by all edge-connected convolutional layers in the local feature extraction layer are integrated as an input of the multi-layer perceptron, a local feature set of the atomic point cloud is outputted, and then the global features are outputted after a global pooling operation of the pooling layer.

The segmentation layer is composed of a plurality of multi-layer perceptron and a softmax regression layer, the local features of the atomic points outputted by all edge-connected convolutional layers in the local feature extraction layer and the global features outputted by the global feature extraction layer are integrated as an input, and a score of the protein domain category label of each atomic point is generated after operations of the plurality of multi-layer perceptron and the softmax regression layer.

Further, the edge-connected convolutional operation of the edge-connected convolutional layer is specifically as follows:

Recording an edge-connecting feature between an atomic point $k_i$ and an atomic point $k_j$ in the local directed graph as $e_{ij}$, and recording an edge-connected set of the atomic point $k_i$ and K-nearest neighbor atomic points as $E_i$; and a calculation formula of the edge-connecting feature $e_{ijm}$ between the atomic point $k_i$ and the atomic point $k_j$ outputted by an $m^{th}$ convolutional kernel is as follows:

$$e_{ijm} = h_\Theta(\theta_m \cdot (F_{k_j} - F_{k_i}), \varphi_m \cdot F_{k_i}, \omega_m \cdot HB_{k_i k_j})$$

where $h_\Theta$ is a non-linear function, $F_{k_j} - F_{k_i}$ is a feature distance between the atomic point $k_i$ and the atomic point $k_j$, $F_{k_i}$ is a point cloud feature of the atomic point $k_i$, and $HB_{k_i k_j}$ is whether the atomic point $k_i$ and the atomic point $k_j$ have a condition for forming a hydrogen bond therebetween; $h_\Theta$ has a group of learnable parameters $\Theta$, $\Theta = (\theta_1, \ldots, \theta_M, \varphi_1, \ldots, \varphi_M, \omega_1, \ldots, \omega_M)$, coding M different convolutional kernels; $\theta_m$ is a convolutional kernel with the same dimension as $F_{k_j} - F_{k_i}$, $\varphi_m$ is a convolutional kernel with the same dimension as $F_{k_i}$, $\omega_m$ is a convolutional kernel with the same dimension as $HB_{k_i k_j}$, and · represents an Euclidean inner product.

Applying a maximum pooling operation to the edge-connecting feature of the K nearest neighbor atomic points of each atomic point $k_i$, then recording a local feature vector of the atomic point $k_i$ after a convolutional operation as $W_{k_i} = [W_{k_i 1}, \ldots, W_{k_i M}]$, and a local feature generated by the $m^{th}$ convolutional kernel as $W_{k_i m} = \max_{j:(i,j) \in E_i} e_{ijm}$, where $j:(i,j) \in E_i$ represents a connected edge between the atomic point $k_i$ and a nearest neighbor atomic point $k_j$ belonging to $E_i$.

Further, $HB_{k_i k_j}$ is calculated as follows:
(1) when the atomic point $k_i$ is not nitrogen, or the atomic point $k_j$ is not oxygen, $HB_{k_i k_j} = 0$;
(2) when the atomic point $k_i$ is nitrogen, and the atomic point $k_j$ is oxygen:

(a) when $$\hat{d}_{N_{k_i}-H_{k_i}-O_{k_j}} \geq \frac{2}{3}$$

and $$dis_{H_{k_i}-O_{k_j}} \leq 3\text{Å}, HB_{k_ik_j} = 1;$$

(b) when $$\hat{d}_{N_{k_i}-H_{k_i}-O_{k_j}} < \frac{2}{3}$$

and $$dis_{H_{k_i}-O_{k_j}} > 3\text{Å}, HB_{k_ik_j} = 0;$$

where $$dis_{H_{k_i}-O_{k_j}}$$

is a distance between a hydrogen atom $H_{k_i}$ and an oxygen atom $k_j$ on a nitrogen atom $k_i$; and an angle calculated according to three-dimensional coordinates of the nitrogen atom $k_i$ and the hydrogen atom $H_{k_i}$ and the oxygen atom $k_j$ on the nitrogen atom $k_i$ after standardized preprocessing is recorded as $$d_{N_{k_i}-H_{k_i}-O_{k_j}},$$

and $$\hat{d}_{N_{k_i}-H_{k_i}-O_{k_j}}$$

is an angle of $$d_{N_{k_i}-H_{k_i}-O_{k_j}}$$

after normalization processing.

Further, a protein domain identification result predicted by the point cloud segmentation model is corrected, and a correction condition includes: atomic points of the same amino acid shall belong to the same protein domain category; for a certain atomic point, the atomic point, an atomic point of the previous amino acid and an atomic point of the next amino acid shall belong to the same protein domain category if the protein domain category is the same; and if in a certain protein three-dimensional structure image, the quantity of the atomic points belonging to the protein domain of a certain category is less than a threshold value, further manual correction is required.

According to a second aspect of the present application, provided is a system for identifying a protein domain based on a protein three-dimensional structure image; the system includes the following modules: a data acquisition and preprocessing module, a model constructing module, a model training module, and a model prediction module.

The data acquisition and preprocessing module is configured to acquire protein information, protein domain annotation information, a protein three-dimensional experimental structure, a protein three-dimensional computational structure and protein secondary structure annotation information, so as to generate a training set and a target set.

Generation of the training set includes: extracting three-dimensional coordinates of carbon, nitrogen and oxygen atoms in a main chain from the protein three-dimensional experimental structure to construct three-dimensional atomic point cloud, and after standardized preprocessing, giving each atomic point a semantic label of the protein domain to which each atomic point belongs, so as to form the protein three-dimensional structure image as the training set.

Generation of the target set includes: extracting three-dimensional coordinates of carbon, nitrogen and oxygen atoms in a main chain from the protein three-dimensional computational structure to construct three-dimensional atomic point cloud, and after standardized preprocessing, forming the protein three-dimensional structure image as the target set.

The model constructing module is configured to construct a point cloud segmentation model, and constructing a point cloud segmentation model includes the following steps.

Constructing, by the atomic points in the protein three-dimensional structure image, a local directed graph according to a K-nearest neighbor classification algorithm.

Constructing the point cloud segmentation model based on a dynamic graph convolutional neural network according to the local directed graph.

Further, the point cloud segmentation model includes a local feature extraction layer, a global feature extraction layer and a segmentation layer; the protein three-dimensional structure image is inputted into the point cloud segmentation model after feature extraction, local features are extracted through the local feature extraction layer, global features are extracted through the global feature extraction layer, and the local features and the global features are integrated through the segmentation layer to output a score of a protein domain category label of each atomic point.

The local feature extraction layer is composed of a plurality of edge-connected convolutional layers which are sequentially connected, and each edge-connected convolutional layer inputs a local directed graph feature of each atomic point and outputs the local feature of each atomic point after an edge-connected convolutional operation; an output of the previous edge-connected convolutional layer serves as an input of the next edge-connected convolutional layer.

The global feature extraction layer is composed of a multi-layer perceptron and a pooling layer, the local features of the atomic points outputted by all edge-connected convolutional layers in the local feature extraction layer are integrated as an input of the multi-layer perceptron, a local feature set of the atomic point cloud is outputted, and then the global features are outputted after a global pooling operation of the pooling layer.

The segmentation layer is composed of a plurality of multi-layer perceptron and a softmax regression layer, the local features of the atomic points outputted by all edge-connected convolutional layers in the local feature extraction layer and the global features outputted by the global feature extraction layer are integrated as an input, and a score of the protein domain category label of each atomic point is generated after operations of the plurality of multi-layer perceptron and the softmax regression layer.

The model training module configured to extract features of the protein three-dimensional structure image in the training set, and then train the point cloud segmentation model.

The model prediction module configured to identify the protein domain of the target set after feature extraction by using the trained point cloud segmentation model.

According to the third aspect of the specification, there is provided a computer device, which includes a memory and a processor; computer-readable instructions are stored in the memory, and when executed by the processor, the computer-readable instructions cause the processor to perform the steps in the method for identifying a protein domain based on a protein three-dimensional structural image.

According to a fourth aspect of the present specification, there is provided a storage medium storing computer-readable instructions, which, when executed by one or more processors, cause one or more processors to perform the steps in the method for identifying a protein domain based on protein three-dimensional structural images.

The present application has the advantages that the protein domain is identified based on structural similarity, and the protein domain identification error caused by protein multi-sequence alignment error can be effectively solved when the sequence consistency is not high; the point cloud segmentation model based on the dynamic graph convolutional neural network constructed by the present application can simultaneously complete the segmentation of protein domain and the acquisition of protein domain semantic tags by integrating global structural features and local structural features.

BRIEF DESCRIPTION OF DRAWINGS

In order to more clearly explain the embodiments of the present application or the technical solution in the prior art, the drawings needed in the description of the embodiments or the prior art will be briefly introduced below. Obviously, the drawings in the following description are some embodiments of the present application, and other drawings can be obtained by those skilled in the art without paying creative labor.

DESCRIPTION OF EMBODIMENTS

In order to better understand the technical solution of the application, the embodiments of the application will be described in detail with the attached drawings.

It should be clear that the described embodiment is only a part of the embodiment of this application, not the whole embodiment. Based on the embodiments in this application, all other embodiments obtained by ordinary technicians in this field without creative work belong to the protection scope of this application.

The terminology used in the examples of this application is for the purpose of describing specific embodiments only and is not intended to limit this application. The singular forms "a", "the" and "said" used in the embodiments of this application are also intended to include the plural forms, unless the context clearly indicates other meaning.

In the present application, the three-dimensional structure of protein refers to the three-dimensional shape of protein formed by folding and combining linear amino acid chains (sometimes called polypeptides). Amino acid side chains may interact and combine in many ways. The interaction and chemical bonds of specific protein side chains determine its tertiary structure.

Protein domain refers to a region on the polypeptide chain of protein, which is self-stable and folds independently of other regions, and is the structural, functional and evolutionary unit of protein. Many proteins consist of several domains. The same domain may appear in various protein. The same kind of domains have certain similarities in structure or function. A combination containing specific protein domains is defined as a protein family.

Figure 1:
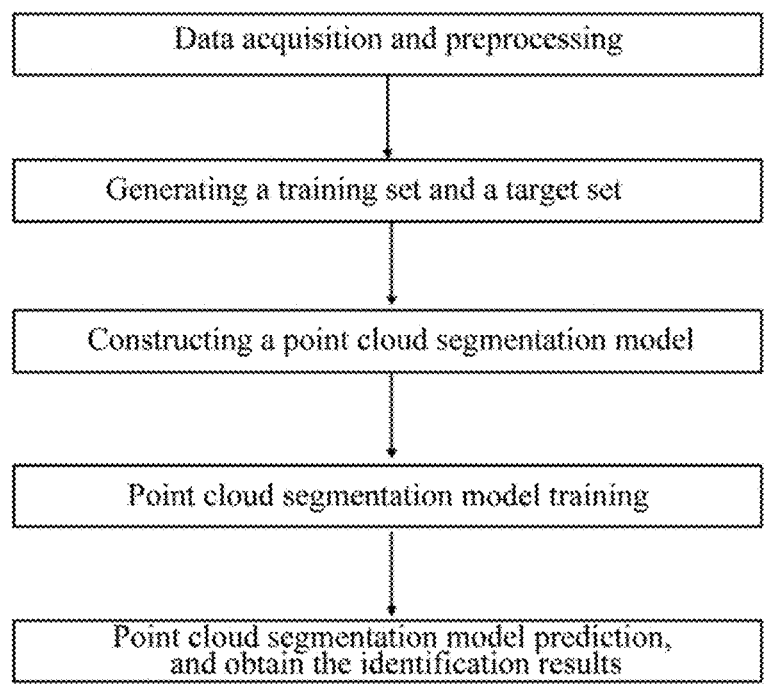
FIG. 1 is a flowchart of a method for identifying a protein domain based on a protein three-dimensional structure image provided by an exemplary embodiment.
Figure 2:
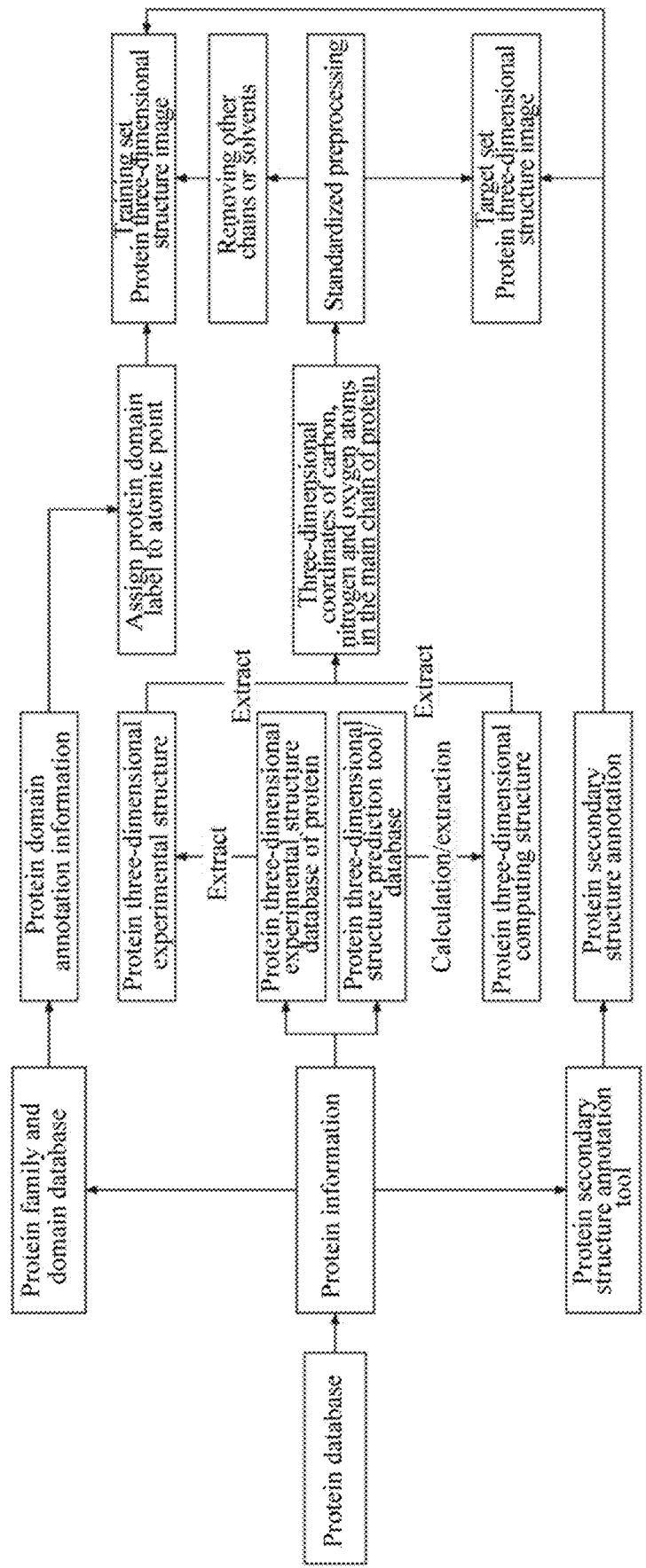
FIG. 2 is a flowchart of data acquisition and preprocessing provided by an exemplary embodiment.

The present application provides a method for identifying a protein domain based on protein three-dimensional structure image, as shown in FIG. 1, which includes the following steps:

S1. Data acquisition and preprocessing, as shown in FIG. 2, includes the following steps:

S1.1. Protein information of various species, such as human, mouse, fruit fly, etc., is extracted from the protein database, including login number, gene name, amino acid sequence, protein three-dimensional experimental structure information and protein family annotation information. The protein database can use UniProt Swiss-Prot which has been manually audited, but it is not limited thereto.

S1.2. The annotation information of the protein domain of each species ix extracted from the protein family and domain database, including the name of protein domain and the starting and ending sites of each protein domain in the amino acid sequence of protein. The database of protein family and domain can adopt InterPro, SMART or Pfam, but it is not limited thereto.

S1.3. The relevant information of the protein three-dimensional experimental structure of each species is extracted from the protein three-dimensional experimental structure database, including the corresponding protein database login number, the atomic coordinates of the three-dimensional experimental structure, and the chain of the three-dimensional experimental structure and the amino acid sequence corresponding to the chain. Since each protein may contain multiple three-dimensional experimental structures, only one three-dimensional experimental structure with the longest length or the highest resolution is reserved for each protein database login number. The protein three-dimensional experimental structure database can adopt PDB, but it is not limited thereto.

S1.4. A protein three-dimensional structure prediction tool constructed based on algorithms such as a deep learning neural network is used to predict the protein three-dimensional computing structure, or the protein three-dimensional computing structure is directly extracted from a protein three-dimensional computing structure database. The relevant information of the three-dimensional computing structure includes corresponding protein database login number, atomic coordinates of three-dimensional computing structure and amino acid sequence corresponding to the structure. The protein three-dimensional structure prediction tool can use AlphaFold2, RoseTTAFold and the like, and the protein three-dimensional computational structure database can use AlphaFoldDB, but it is not limited thereto.

S1.5. The secondary structure of protein is extracted from the protein database by using a protein secondary structure annotation tool, and three types of secondary structure are annotated, namely α-helix (H), β-sheet (E) and random coil (C), where the secondary structure types can be expanded to 8 types as required. The protein secondary structure annotation tool can use DS SP, but it is not limited thereto.

S2. A training set is generated, which is specifically as follows.

Figure 3:
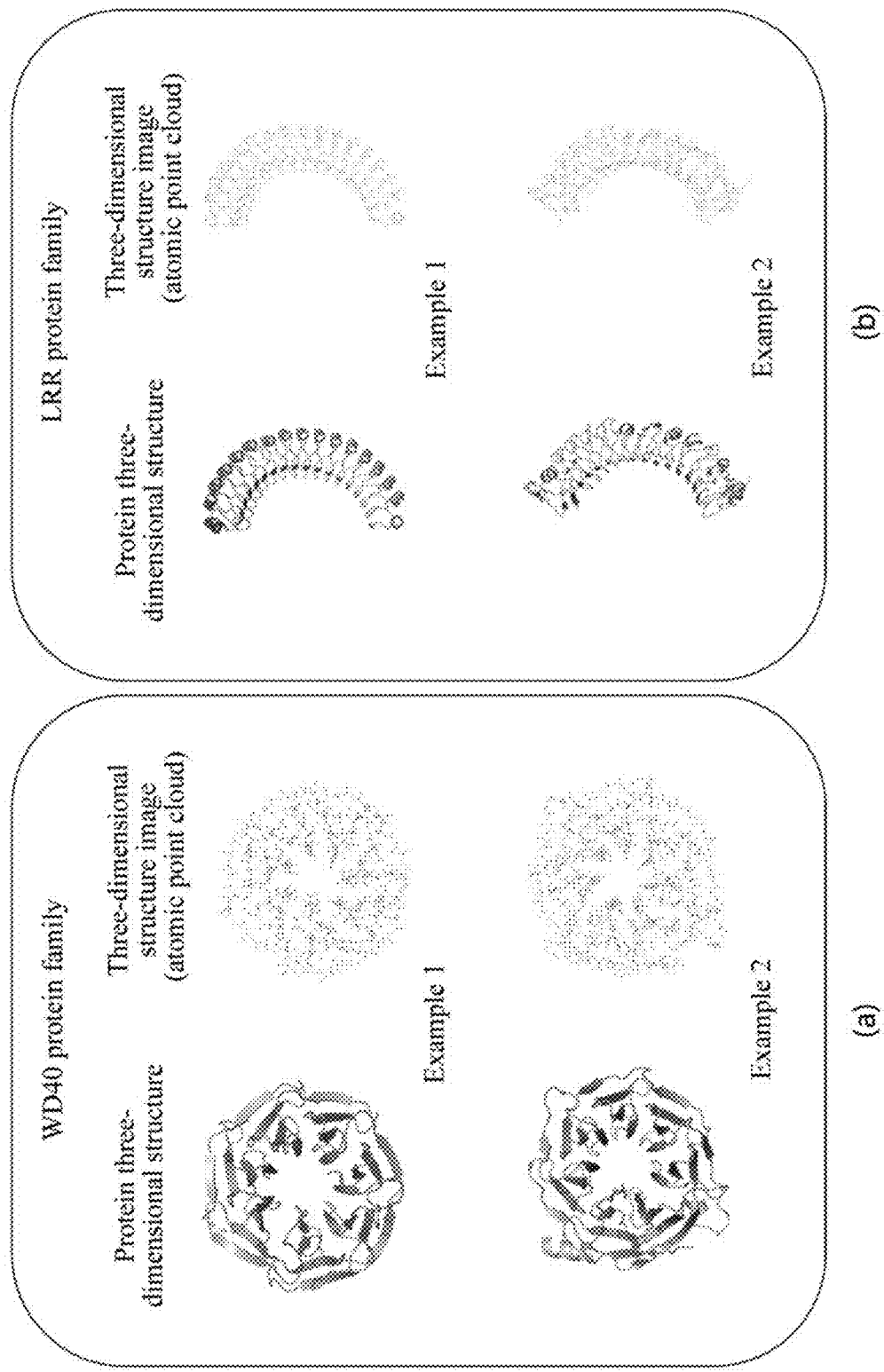
FIG. 3 is a typical example of protein domain and atomic point cloud provided by an exemplary embodiment, in which (a) is WD40 domain and (b) is LRR domain.

According to the chain annotation information of the protein three-dimensional experimental structure, other chains or solvents, such as small inhibitors, peptides and water, are removed from protein three-dimensional experimental structure. The three-dimensional coordinates of carbon, nitrogen and oxygen atoms in the main chain of the remaining protein three-dimensional experimental structure are extracted to construct a three-dimensional atomic point cloud, as shown in FIG. 3. After standardized pretreatment, according to the annotation information of the protein family and domain database, each atomic point is given a semantic label of the protein domain to which it belongs (the atomic point without protein domain is given 0), and a three-dimensional structural image of protein is formed as a training set.

S3. A target se generated, which is specifically as follows.

The three-dimensional coordinates of carbon, nitrogen and oxygen atoms in the main chain are extracted from the three-dimensional calculation structure of protein obtained in S1.4, and a three-dimensional atomic point cloud is constructed. After the same standardized pretreatment as in S2, the three-dimensional structure image of protein is formed as the target set.

In one embodiment, the standardization pretreatment of three-dimensional atomic point cloud is as follows: firstly, all atomic points are transferred to the local coordinate system with the geometric center as the origin, and then these atomic points are normalized to the unit sphere; specifically, the maximum L2 norm of all atomic point coordinates is recorded as N, all atomic point coordinates are divided by N, and these atomic points are scaled and translated to [0,1]; the three-dimensional coordinate of an atomic point k is $P_k$, and the three-dimensional coordinate after standardization pretreatment is $\widehat{P_k}$; the formula is as follows:

$$P_k = (x, y, z)$$

$$\widehat{P_k} = (\hat{x}, \hat{y}, \hat{z}) = \left(\frac{x}{N}, \frac{y}{N}, \frac{z}{N}\right)$$

S4. A protein domain is identified based on the point cloud segmentation model of a dynamic graph convolutional neural network.

S4.1. Supposing that the protein three-dimensional structure image has n atomic points, and the atomic points have an order. The first atomic point in the main chain of the protein amino acid sequence is recorded as $k_1$, and the point cloud set is recorded as Points=$\{k_1, \ldots, k_n\}$.

Each atomic point has a b-dimensional feature, and besides the three-dimensional coordinates of the atomic point after standardized pretreatment, it can also include the relative sequence o of the amino acid to which the atomic point belongs in protein, the atomic type c, the secondary structure annotation information s of the amino acid to which the atomic point belongs, and the angle d formed by the atomic point and its neighboring atomic points.

Figure 4:
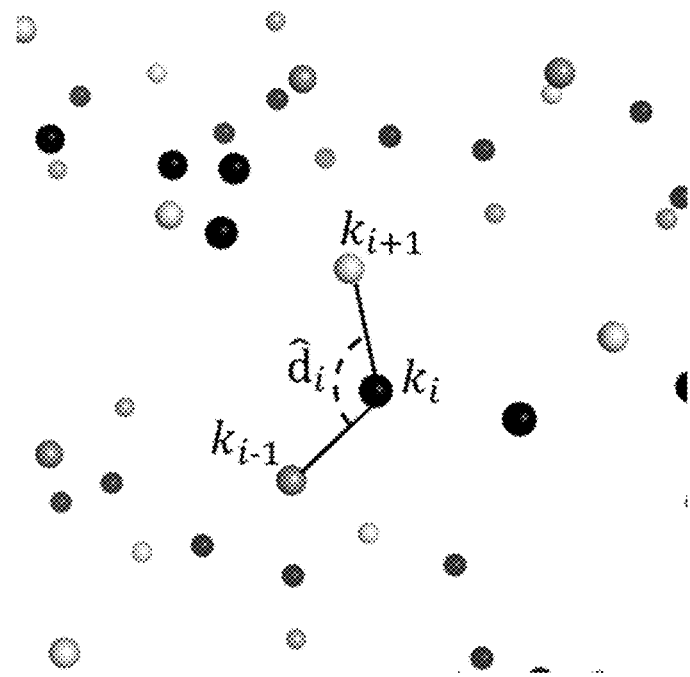
FIG. 4 is a schematic diagram for calculating the angle of an atomic point provided by an exemplary embodiment.

The relative sequence o of the amino acid to which the atomic point belongs in protein is divided by the largest amino acid number $o_{max}$ to obtain a normalized relative sequence ô; the angle d is divided by 180° to obtain the normalized angle $\hat{d}$, and the angle d takes the inferior angle formed by connecting three atomic points in sequence instead of the superior angle, as shown in FIG. 4.

There are only four types of atoms, namely α carbon (CA), other carbon (C), oxygen (O) and nitrogen (N). A three-dimensional vector $\vec{A}_i$ is constructed for the atomic point $k_i$:

$$\vec{A}_i = [A_{CA_i}, A_{C_i}, A_{O_i}, A_{N_i}]$$

For example, if the atomic point $k_i$ is an α carbon atom, then $A_{CA_i}=1$, $A_{C_i}=0$, $A_{O_i}=0$, $A_{N_i}=0$, $\vec{A}_i=[1, 0, 0, 0]$ in the vector $\vec{A}_i$.

Only three kinds of secondary structure annotation information of amino acids to which the atomic point belongs are taken, namely α-helix (H), β-sheet (E) and random coil (C), and a three-dimensional vector $\vec{S}_i$ is constructed for atomic point $k_i$:

$$\vec{S}_i = [S_{H_i}, S_{E_i}, S_{C_i}]$$

For example, the secondary structure annotation information of the amino acid to which the atomic point $k_i$ belongs is β-sheet, then $S_{H_i}=0$, $S_{E_i}=1$, $S_{C_i}=0$, $\vec{S}_i=[0, 1, 0]$ in the vector $\vec{S}_i$.

Finally, the point cloud feature $F_{k_i}$ of the atomic point $k_i$ of the protein three-dimensional structure image is recorded as:

$$F_{k_i} = \{\hat{x}_i, \hat{y}_i, \hat{z}_i, \hat{o}_i, A_{CA_i}, A_{C_i}, A_{O_i}, A_{N_i}, S_{H_i}, S_{E_i}, S_{C_i}, \hat{d}_i\}$$

where $\hat{x}_i$, $\hat{y}_i$, $\hat{z}_i$ are the three-dimensional coordinates of the atomic point $k_i$ after normalization, $\hat{o}_i$ is the relative sequence of the atomic point $k_i$ after normalization, $\hat{d}_i$ is the result of the angle $d_i$ formed by atomic points $k_{i-1}$, $k_i$, $k_{i+1}$ after normalization, $A_{CA_i}$, $A_{C_i}$, $A_{O_i}$, $A_{N_i}$ are the identifiers of the four atomic types, namely α carbon, other carbon, oxygen and nitrogen, and $S_{H_i}$, $S_{E_i}$, $S_{C_i}$ are the identifiers of three secondary structure annotation information, namely α helix, β-sheet and random coil.

S4.2. Different protein secondary structures have different ways of folding the main chain. For example, in the α helix, the main chain is coiled in a spiral, each spiral is composed of 3.6 amino acids, and the distance between the spiral circles is 5.44 Å (Å is a common measurement unit of light wave length and molecular diameter), in which all peptide bonds in the main chain can form hydrogen bonds; the β-sheet is composed of several β-sheets arranged in parallel or antiparallel, and the main chain of each β-sheet is kept stable by hydrogen bonds, and the main chain of each β-sheet is zigzag folded on an approximate plane. In order to maintain the secondary and tertiary structure folding of protein, apart from the peptide bond in the main chain, the main holding force is the hydrogen bond formed between carbonyl and acyl groups in the skeleton, so the distance and angle between the atoms in the main chain are very important. The present application defines a local directed graph G, recorded as G=(V, A), which is constructed for atomic points in three-dimensional structure image according to the K nearest neighbor classification (KNN) algorithm, where V is the set of all atomic points in protein three-dimensional structure image, and A is the connected edge set among ordered atomic points.

S4.3. According to the local directed graph g, a point cloud segmentation model based on a dynamic graph convolutional neural network is constructed.

The features extracted by S4.1 from the three-dimensional structure image of protein are input into the point cloud segmentation model; The point cloud segmentation model mainly includes a local feature extraction layer, a global feature extraction layer and a segmentation layer.

The local feature extraction layer is sequentially connected by a plurality of edge-connected convolution layers, and each edge-connected convolution layer inputs the local directed graph features of each atomic point, and outputs the local features of each atomic point after edge convolution operation. The output of the last edge-connected convolution layer is used as the input of the next edge-connected convolution layer.

The global feature extraction layer consists of a multi-layer perceptron and a pooling layer. The local features of the atomic points output by all the edge-connected convolution layers in the local feature extraction layer are integrated as the input of the multi-layer perceptron, and the local feature set of the atomic point cloud is output, and then a one-dimensional global feature is output through the global pooling operation of the pooling layer.

The segmentation layer consists of several multi-layer perceptron and a softmax regression layer. The local features of all atomic points output by edge-connected convolution layers in the local feature extraction layer and the one-dimensional global features output by the global feature extraction layer are integrated as the input of the segmentation layer, and the scores of protein domain category labels of each atomic point are generated after the operation of several multi-layer perceptron and a softmax regression layer.

Figure 7:
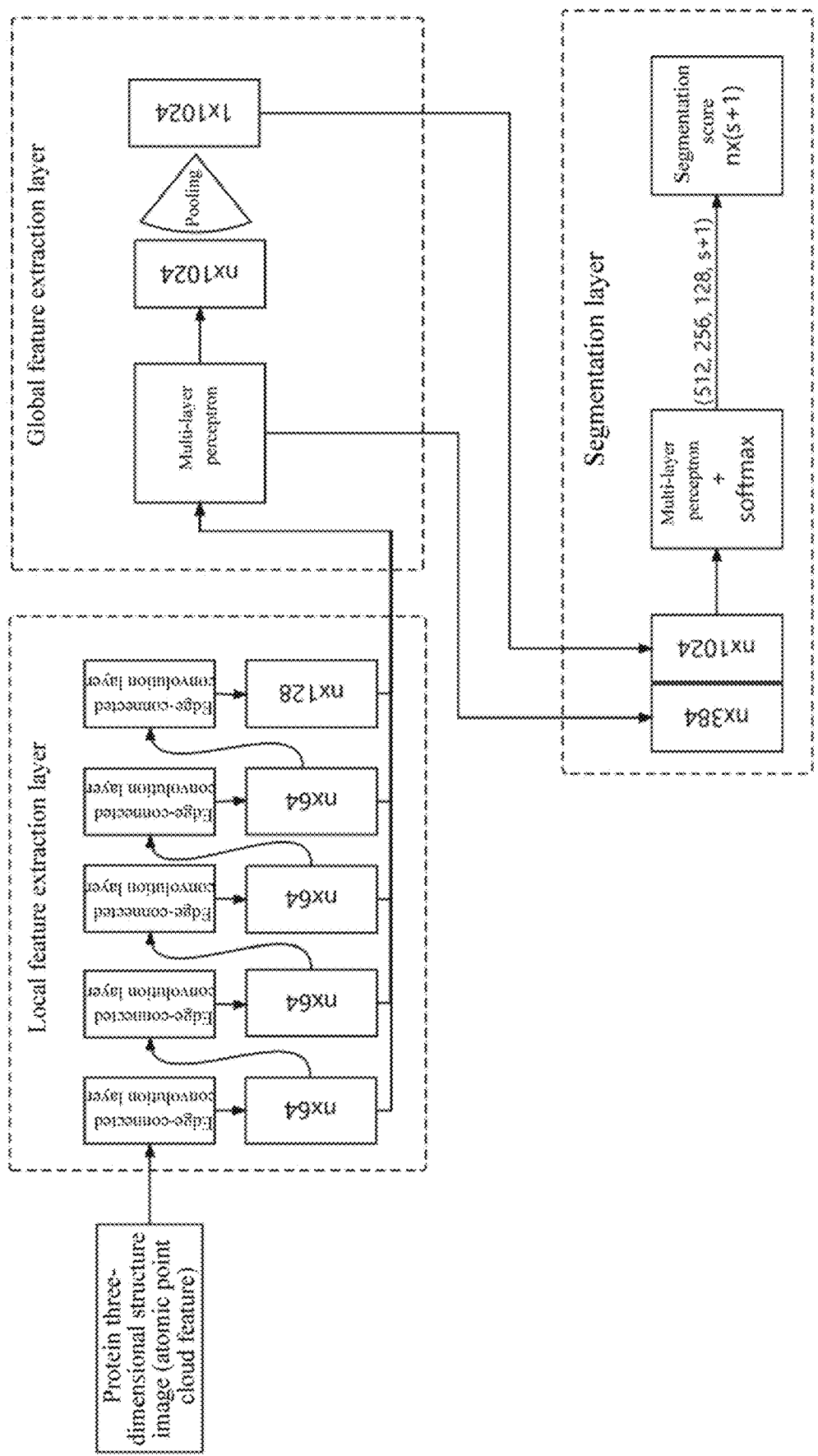
FIG. 7 is a structural diagram of a point cloud segmentation model based on a dynamic graph convolutional neural network provided by an exemplary embodiment.

In one embodiment, the structure of the point cloud segmentation model based on dynamic graph neural network is shown in FIG. 7, which consists of a local feature extraction layer (including five edge-connected convolution layers), a global feature extraction layer and a segmentation layer. The point cloud feature (n×12) of all atomic points in the three-dimensional structure image of the protein, where n is the total number of atomic points, and 12 represents that each atomic point has 12-dimensional features.

Figure 5:
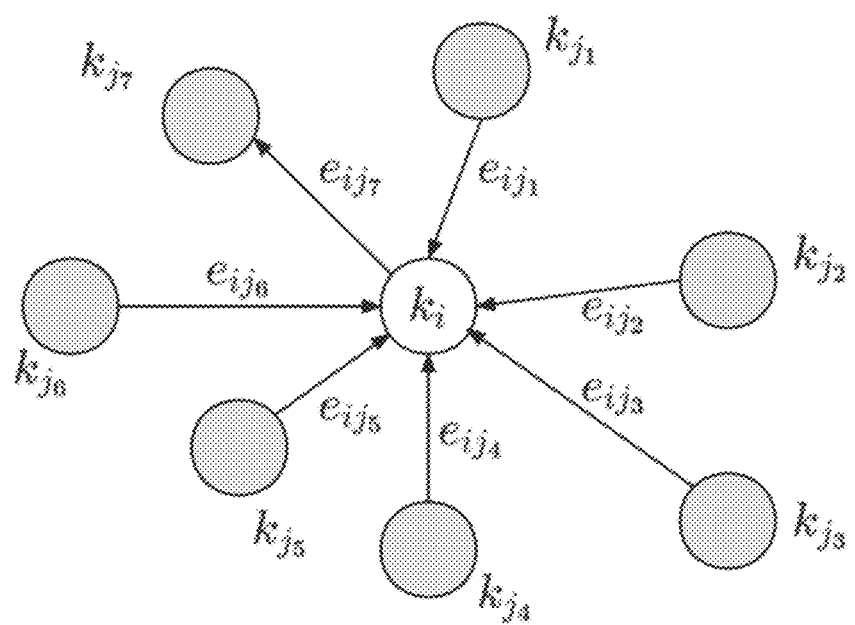
FIG. 5 is a local directed graph corresponding to the atomic point $k_i$ provided by an exemplary embodiment.
Figure 8:
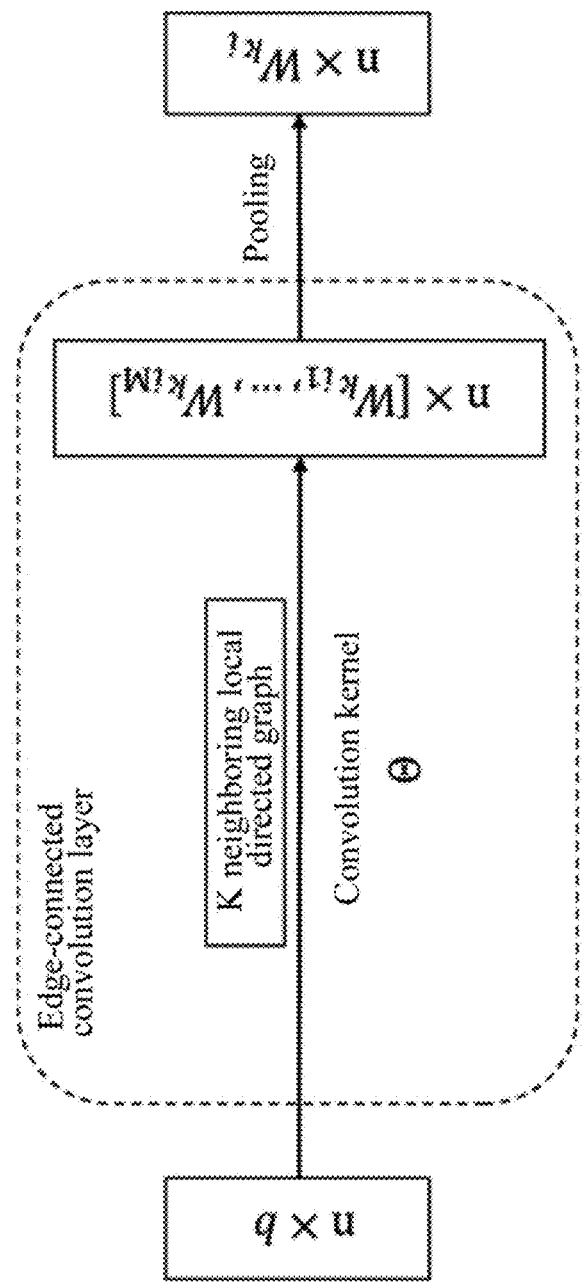
FIG. 8 is a schematic diagram of the implementation of a local feature extraction layer provided by an exemplary embodiment.

In one embodiment, the structure of the edge-connected convolution layer is shown in FIG. 8, which is realized by edge convolution operation. In a locally directed graph G, the feature of the edges between atomic point $k_i$ and atomic point $k_j$ is denoted as $e_{ij}$, and the set of edges between atomic point $k_i$ and K-nearest neighbor atomic points is denoted as $E_i$. A nonlinear function $h_\Theta$ is used to calculate the edge-connecting feature between each atomic point $k_i$ and K-nearest neighbor atomic points $k_j$, as shown in FIG. 5. The formula of the edge-connecting feature $e_{ijm}$ between the atomic point $k_j$ and the atomic point $e_{ijm}$ output through the $m^{th}$ convolution kernel is as follows:

$$e_{ijm} = h_\Theta(\theta_m \cdot (F_{k_j} - F_{k_i}), \varphi_m \cdot F_{k_i}, \omega_m \cdot HB_{k_i k_j})$$

The nonlinear function $h_\Theta$ combines the local structural features, global structural features of atomic points and hydrogen bonding information within the structure. $F_{k_j} - F_{k_i}$ is the feature distance between the atomic point $k_i$ and atomic point $k_j$, $F_{k_i}$ is the point cloud feature of the atomic point $k_i$, and $HB_{k_i k_j}$ is whether there is a condition for forming a hydrogen bonding between the atomic point $k_i$ and the atomic point $k_j$. $h_\Theta$ has a set of learnable parameters $\Theta$, $\Theta = (\theta_1, \ldots, \theta_M, \varphi_1, \ldots, \varphi_M, \omega_1, \ldots, \omega_M)$, and M different convolution kernels are encoded. $\theta_m$ is a convolution kernel with the same dimension as $F_{k_j} - F_{k_i}$, $\varphi_m$ is a convolution kernel with the same dimension as $F_{k_i}$, $\omega_m$ is a convolution kernel with the same dimension as $HB_{k_i k_j}$; and · represents Euclidean inner product. For example, the activation function ReLU is used, the calculated edge-connecting feature of the atomic point $k_i$ and the atomic point $k_j$ output through the $m^{th}$ convolution kernel is recorded as $e'_{ijm}$.

$$e'_{ijm} = \text{ReLU}(\theta_m \cdot (F_{k_j} - F_{k_i}), \varphi_m \cdot F_{k_i}, \omega_m \cdot HB_{k_i k_j})$$

On the main chain of protein, if the distance and angle between the main chain nitrogen atom and the adjacent main chain oxygen atom (nitrogen atom and oxygen atom are not from the same amino acid) meet certain conditions, the hydrogen atom on the main chain nitrogen atom and the adjacent main chain oxygen atom have the conditions to form a backbone hydrogen bond, which is recorded as $HB_{k_i k_j} = 1$, otherwise $HB_{k_i k_j} = 0$. The specific calculation process is as follows:

(1) When the atomic point $k_i$ is not nitrogen $A_{N_i} = 0$ or the atomic point $k_j$ is not oxygen $A_{O_j} = 0$, $HB_{k_i k_j} = 0$.

Figure 6:
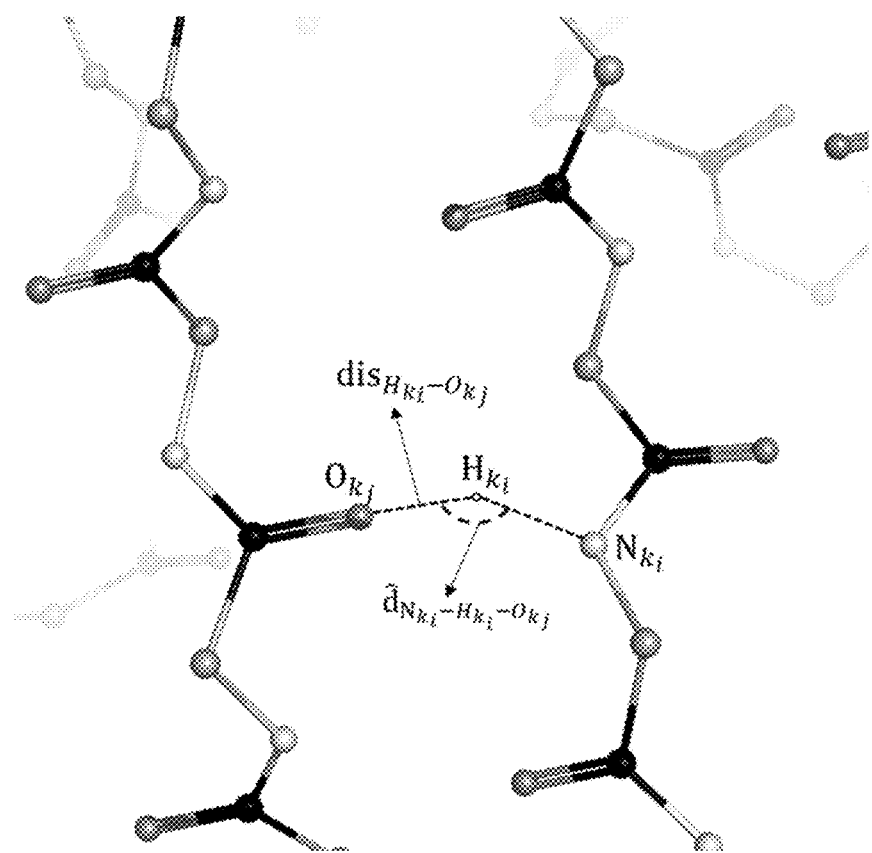
FIG. 6 is a schematic diagram of parameters for calculating whether hydrogen bonds exist between nitrogen atoms and oxygen atoms in the main chain provided by an exemplary embodiment.

(2) When the atomic point $k_i$ is nitrogen $A_{N_i} = 1$ and the atomic point $k_j$ is oxygen $A_{O_j} = 1$:

(a) when and $$\hat{d}_{N_{k_i} - H_{k_i} - O_{k_j}} \geq \frac{2}{3}$$

and $$dis_{H_{k_i} - O_{k_j}} \leq 3\text{Å}, HB_{k_i k_j} = 1;$$

and (b) when $$\hat{d}_{N_{k_i} - H_{k_i} - O_{k_j}} < \frac{2}{3}$$

and $$dis_{H_{k_i}-O_{k_j}} > 3\text{Å}, HB_{k_ik_j} = 0;$$

where $$dis_{H_{k_i}-O_{k_j}}$$

is the distance between the hydrogen atom $H_{k_i}$ and the oxygen atom $k_j$ on the nitrogen atom $k_i$ calculated through the distance function $$f:dis_{H_{k_i}-O_{k_j}} = f(P_{H_{k_i}}, P_{k_j}), P_{k_j}$$

represents the coordinate of the oxygen atom $k_j$, and the coordinate of the hydrogen atom $$P_{H_{k_i}}$$

is calculated by using the pdb2gmx tool of GROMACS software, all of which use non-standardized original coordinates.

$$d_{N_{k_i}-H_{k_i}-O_{k_j}}$$

is an angle calculated by the angle function g according to the coordinates of the nitrogen atom $k_i$ and hydrogen atom $H_{k_i}$ and oxygen atom $k_j$ on the nitrogen atom $k_i$. As shown in FIG. 6, $$d_{N_{k_i}-H_{k_i}-O_{k_j}} = g(\hat{P}_{k_i}, \hat{P}_{H_{k_i}}, \hat{P}_{k_j}), \hat{P}_{k_i}, \hat{P}_{H_{k_i}}, \hat{P}_{k_j}$$

are the three-dimensional coordinates of the nitrogen atom $k_i$, the hydrogen atom $H_{k_i}$ and the oxygen atom $k_j$ respectively after standardization pretreatment, and the normalized angle of $$d_{N_{k_i}-H_{k_i}-O_{k_j}}$$

is recorded as $$\hat{d}_{N_{k_i}-H_{k_i}-O_{k_j}} = \frac{d_{N_{k_i}-H_{k_i}-O_{k_j}}}{180°}.$$

Then, the maximum pooling operation is applied to the edge-connecting features of the K-nearest neighbor atomic points of each atomic point $k_i$, and the local feature vector after the convolution operation of the atomic point $k_i$ is recorded as $W_{k_i}=[W_{k_{i1}}, \ldots, W_{k_{iM}}]$, and the calculation formula of the local feature $W_{k_{im}}$ generated by the $m^{th}$ convolution kernel is as follows:

$$W_{k_{im}} = \max_{j:(i,j) \in E_i} e_{ijm}$$

where $j:(i,j) \in E_i$ indicates that the edge between the atomic point $k_i$ and the neighboring atomic point $k_j$ belongs to $E_i$.

In one embodiment, the structure of the global feature extraction layer is as shown in FIG. 7. The output (n×64, n×64, n×64, n×64, n×128) of all edge-connected convolution layers in the local feature extraction layer is integrated as the input of the multi-layer perceptron, and the number of channels is 1024, and the features of each atomic point are output with a total of 1024 dimensions (n×1024), and then a 1-dimensional global feature (n×1024) is generated through the pooling operation of the pooling layer.

In one embodiment, the structure of the segmentation layer is shown in FIG. 7. The output (n×64, n×64, n×64, n×64, n×128) of all the edge-connected convolution layers in the local feature extraction layer r is integrated, and the 1-dimensional global feature (n×1024) of the global feature extraction layer is added to each atomic point to generate the input feature (n×1024) of the multi-layer perceptron and softmax regression layer of the segmentation layer; the number of channels are (512, 256, 128, s+1) respectively after four multi-layer perceptron and softmax regression layer, where s is the number of classes of protein domain, and "+1" refers to the fraction that the atomic point does not belong to any protein domain, and the score of the protein domain category label of each atomic point is generated.

S5. Model training, which is specifically as follows.

After extracting features from the protein three-dimensional structure images in the training set in S4.1, the point cloud segmentation model is trained, and crossEntropy(y, ŷ) is calculated using the cross entropy loss function by comparing output predicted label ŷ of the protein domain of the current atomic point and the real protein domain label y of the atomic point.

S6. By using the trained model, protein domain identification is performed on the target set data after feature extraction, and the results are displayed. Specifically, atomic points belonging to the same protein domain category can be given the same color, indicating the same type of protein domain tags, while atomic points not belonging to any protein domain category can be given the same color.

S7. The identification result of protein domain predicted for the model is corrected specifically as follows.

Since there may be errors in the identification results of protein domain of each atomic point output by the point cloud segmentation model, the semantic tags of atomic points can be corrected; according to the amino acid sequence of protein, each atom point has a relative sequence, so the atoms of the same amino acid should belong to the same protein domain category; for the atomic point $k_i$, if the atomic point of the previous amino acid and the atomic point of the next amino acid belong to the same protein domain category, then the atomic point k 1 belongs to the same protein domain category; and if the number of atomic points belonging to a certain protein domain in a protein three-dimensional structure image is too small, it needs further manual correction.

Corresponding to the aforementioned embodiment of the method for identifying the protein domain based on a protein three-dimensional structure image, the present application also provides an embodiment of the system for identifying the protein domain based on the protein three-dimensional structure image.

Figure 9:
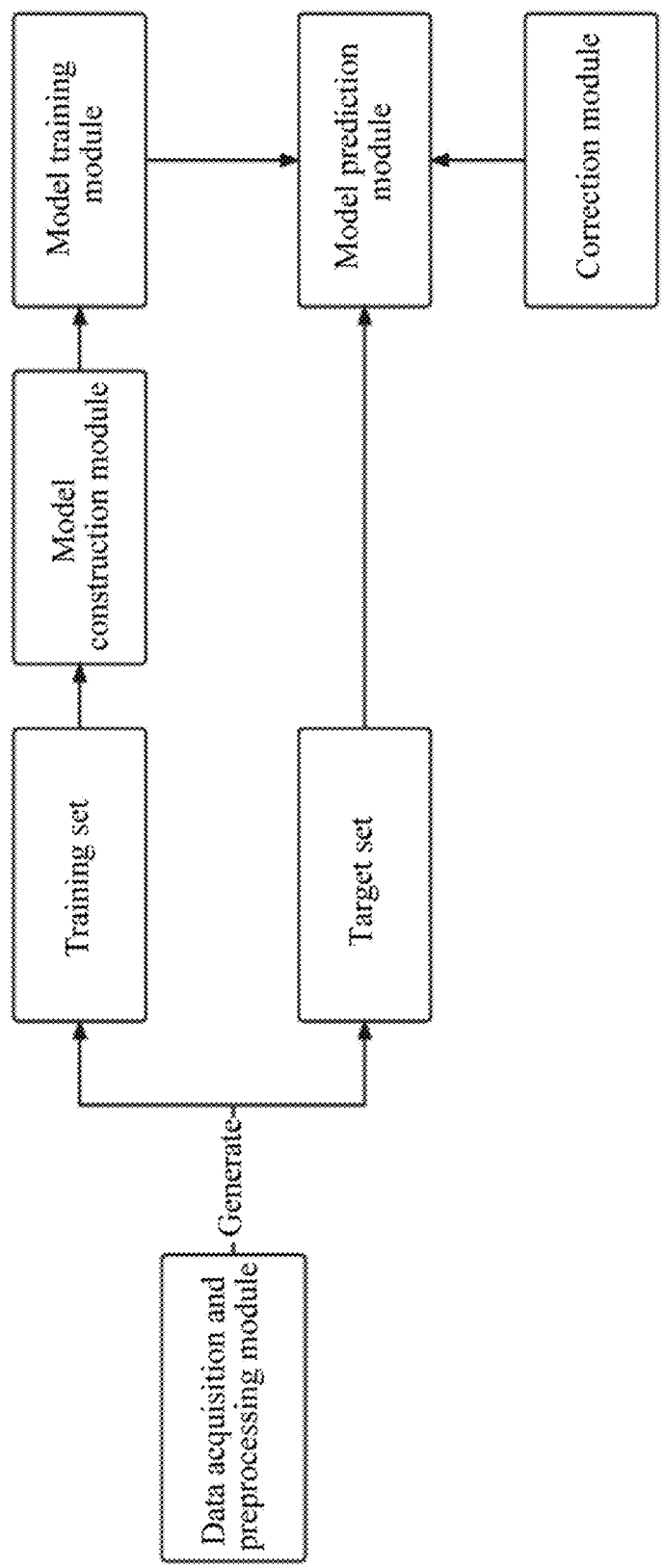
FIG. 9 is a system structure diagram for identifying a protein domain based on a protein three-dimensional structure image provided by an exemplary embodiment.

As shown in FIG. 9, the system for identifying a protein domain based on a protein three-dimensional structure image provided by the embodiment of the present application includes the following modules.

A data acquisition and preprocessing module, configured to acquire protein information, protein domain annotation information, a protein three-dimensional experimental structure, a protein three-dimensional computational structure and protein secondary structure annotation information, so as to generate a training set and a target set.

A model constructing module configured to construct a point cloud segmentation model.

A model training module configured to extract features of the protein three-dimensional structure image in the training set, and then train the point cloud segmentation model.

A model prediction module configured to identify the protein domain of the target set after feature extraction by using the trained point cloud segmentation model.

Generation of the training set includes: extracting three-dimensional coordinates of carbon, nitrogen and oxygen atoms in a main chain from the protein three-dimensional experimental structure to construct three-dimensional atomic point cloud, and after standardized preprocessing, giving each atomic point a semantic label of the protein domain to which each atomic point belongs, so as to form the protein three-dimensional structure image as the training set.

Generation of the target set includes: extracting three-dimensional coordinates of carbon, nitrogen and oxygen atoms in a main chain from the protein three-dimensional computational structure to construct three-dimensional atomic point cloud, and after standardized preprocessing, forming the protein three-dimensional structure image as the target set;

The model constructing module includes the following steps.

Constructing, by the atomic points in the protein three-dimensional structure image, a local directed graph according to a K-nearest neighbor classification algorithm.

Constructing the point cloud segmentation model based on a dynamic graph convolutional neural network according to the local directed graph.

In an embodiment, the point cloud segmentation model includes a local feature extraction layer, a global feature extraction layer and a segmentation layer; the protein three-dimensional structure image is inputted into the point cloud segmentation model after feature extraction, local features are extracted through the local feature extraction layer, global features are extracted through the global feature extraction layer, and the local features and the global features are integrated through the segmentation layer to output a score of a protein domain category label of each atomic point.

Further, the system also includes a correction module, which is realized as follows: according to the amino acid sequence of protein, each atom point has a relative sequence, so the atoms of the same amino acid should belong to the same protein domain category; for the atomic point $k_i$, if the atomic point of the previous amino acid and the atomic point of the next amino acid belong to the same protein domain category, then the atomic point $k_i$ belongs to the same protein domain category; and if the number of atomic points belonging to a certain protein domain in a protein three-dimensional structure image is too small, it needs further manual correction.

The realization of each module can refer to the steps in the method of identifying a protein domain based on a protein three-dimensional structure image.

In one embodiment, a computer device is proposed, which includes a memory and a processor. Computer-readable instructions are stored in the memory, and when the computer-readable instructions are executed by the processor, the processor is caused to execute the steps in the cooperative analysis method of medical data on a blockchain based on the competition mechanism in the above embodiments.

In one embodiment, a storage medium storing computer-readable instructions is proposed, and when the computer-readable instructions are executed by one or more processors, the one or more processors are caused to execute the steps in the collaborative analysis method of medical data on the blockchain based on the competition mechanism in the above embodiments. The storage medium can be a non-volatile storage medium.

Those skilled in the art can understand that all or part of the steps in various methods of the above embodiments can be completed by instructing related hardware through a program, which can be stored in a computer-readable storage medium, which can include: Read Only Memory (ROM), Random Access Memory (RAM), magnetic disk or optical disk, etc.

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The above is only the preferred embodiment of one or more embodiments of this specification, and it is not used to limit one or more embodiments of this specification. Any modification, equivalent substitution, improvement, etc. made within the spirit and principle of one or more embodiments of this specification shall be included in the scope of protection of one or more embodiments of this specification.

What is claimed is:

1. A method for identifying a protein domain based on a protein three-dimensional structure image, comprising:
   step S1, data acquisition and preprocessing, comprising: obtaining protein information, protein domain annotation information, a protein three-dimensional experimental structure, a protein three-dimensional computational structure and protein secondary structure annotation information;
   step S2, generating a training set, comprising: extracting three-dimensional coordinates of carbon, nitrogen and oxygen atoms in a main chain from the protein three-dimensional experimental structure to construct three-dimensional atomic point cloud, giving, after standardized preprocessing, each atomic point a semantic label of a protein domain to which each atomic point belongs, and forming a first protein three-dimensional structure image as the training set;
   step S3, generating a target set, comprising: extracting three-dimensional coordinates of carbon, nitrogen and oxygen atoms in a main chain from the protein three-dimensional computational structure to construct three-dimensional atomic point cloud, and forming, after standardized preprocessing, a second protein three-dimensional structure image as the target set;
   step S4, constructing a point cloud segmentation model, comprising:
   constructing, by atomic points in the first and second protein three-dimensional structure images, a local directed graph according to a K-nearest neighbor classification algorithm; and
   constructing the point cloud segmentation model based on a dynamic graph convolutional neural network according to the local directed graph;
   wherein the point cloud segmentation model comprises a local feature extraction layer, a global feature extraction layer and a segmentation layer; the first and second protein three-dimensional structure images are inputted into the point cloud segmentation model after feature extraction, local features are extracted through the local feature extraction layer, global features are extracted through the global feature extraction layer, and the local features and the global features are integrated through the segmentation layer to output a score of a protein domain category label of each atomic point;
   wherein the local feature extraction layer comprises a plurality of edge-connected convolutional layers which are sequentially connected, a local directed graph feature of each atomic point is input into each of the plurality of edge-connected convolutional layers, each edge-connected convolutional layer outputs the local feature of each atomic point after an edge-connected convolutional operation, and an output of a previous edge-connected convolutional layer is taken as an input of a next edge-connected convolutional layer;
   wherein the global feature extraction layer comprises a multi-layer perceptron and a pooling layer, the local features of the atomic points outputted by all edge-connected convolutional layers in the local feature extraction layer are integrated as an input of the multi-layer perceptron, a local feature set of the atomic point cloud is outputted, and the global features are outputted after a global pooling operation of the pooling layer; and
   wherein the segmentation layer comprises a plurality of multi-layer perceptron and one softmax regression layer, the local features of the atomic points outputted by all edge-connected convolutional layers in the local feature extraction layer and the global features outputted by the global feature extraction layer are integrated as an input, and a score of the protein domain category label of each atomic point is generated after operations of the plurality of multi-layer perceptron and the one softmax regression layer;
   step S5, model training: extracting features of the first protein three-dimensional structure image in the training set, and training the point cloud segmentation model; and
   step S6, model prediction: identifying a protein domain of the target set after feature extraction using the trained point cloud segmentation model.

2. The method for identifying a protein domain based on the protein three-dimensional structure image according to claim 1, wherein step S1 further comprises:
   extracting the protein information of all species from a protein database;
   extracting the protein domain annotation information of all species from a protein family and structural domain database;
   extracting the protein three-dimensional experimental structure from a protein three-dimensional experimental structure database;
   predicting the protein three-dimensional computational structure using a protein three-dimensional structure prediction tool, or extracting the protein three-dimensional computational structure from the protein three-dimensional computational structure database; and
   annotating a protein secondary structure extracted from the protein database by using a protein secondary structure annotation tool.

3. The method for identifying a protein domain based on the protein three-dimensional structure image according to claim 1, wherein in step S2, according to chain annotation information of the protein three-dimensional experimental structure, chains or solvents except for a main chain in the protein three-dimensional experimental structure are removed, and three-dimensional coordinates of carbon, nitrogen and oxygen atoms in the main chain in the protein three-dimensional experimental structure are extracted to construct the three-dimensional atomic point cloud.

4. The method for identifying a protein domain based on the protein three-dimensional structure image according to claim 1, wherein the standardized preprocessing of the three-dimensional atomic point cloud comprises: transferring all atomic points to a local coordinate system with a geometric center as an origin, and normalizing the atomic points into a unit sphere.

5. The method for identifying a protein domain based on the protein three-dimensional structure image according to claim 1, wherein point cloud features of an atomic point of the first and second protein three-dimensional structure images comprise: three-dimensional coordinates of the atomic point after standardized preprocessing, a relative sequence of amino acid to which the atomic point belongs in protein, an atomic type, secondary structure annotation information of the amino acid to which the atomic point belongs, and angles formed between the atomic point and adjacent preceding and following atomic points, the atomic type comprises α carbon, other carbon, oxygen and nitrogen, and the secondary structure annotation information comprises α-helix, β-sheet and random coil; and wherein the relative sequence and the angles are all normalized.

6. The method for identifying a protein domain based on the protein three-dimensional structure image according to claim 1, wherein the edge-connected convolutional operation of the edge-connected convolutional layers comprises:
  denoting an edge-connecting feature between an atomic point $k_i$ and an atomic point $k_j$ in the local directed graph as $e_{ij}$, and denoting an edge-connected set of the atomic point $k_i$ and K-nearest neighbor atomic points as $E_i$; and an edge-connecting feature $e_{ijm}$ between the atomic point $k_i$ and the atomic point $k_j$ outputted by an $m^{th}$ convolutional kernel is calculated as follows:

$$e_{ijm} = h_\Theta(\theta_m \cdot (F_{k_j} - F_{k_i}), \varphi_m \cdot F_{k_i}, \omega_m \cdot HB_{k_i k_j})$$

where $h_\Theta$ represents a non-linear function, $F_{k_j} - F_{k_i}$ represents a feature distance between the atomic point $k_i$ and the atomic point $k_j$, $F_{k_i}$ represents a point cloud feature of the atomic point $k_i$, and $HB_{k_i k_j}$ represents whether a condition for forming a hydrogen bond between the atomic point $k_i$ and the atomic point $k_j$ exists; $h_\Theta$ has a group of learnable parameters $\Theta$, $\Theta = (\theta_1, \ldots, \theta_M, \varphi_1, \ldots \varphi_M, \omega_1, \ldots, \omega_M)$, coding M different convolutional kernels; $\theta_m$ represents a convolutional kernel with a same dimension as $F_{k_j} - F_{k_i}$, $\varphi_m$ represents a convolutional kernel with the same dimension as $F_{k_i}$, $\omega_m$ represents a convolutional kernel with a same dimension as $HB_{k_i k_j}$, and · represents an Euclidean inner product; and
  applying a maximum pooling operation to the edge-connecting feature of the K-nearest neighbor atomic points of each atomic point $k_i$, recording a local feature vector of the atomic point $k_i$ after a convolutional operation as $W_{k_i} = [W_{k_{i1}}, \ldots, W_{k_{iM}}]$, and a local feature generated by an $m^{th}$ convolutional kernel as $W_{k_{im}} = \max_{j:(i,j) \in E_i} e_{ijm}$, wherein $j:(i,j) \in E_i$ represents a connected edge between the atomic point $k_i$ and a nearest neighbor atomic point $k_j$ belonging to $E_i$.

7. The method for identifying a protein domain based on the protein three-dimensional structure image according to claim 6, wherein $HB_{k_i k_j}$ is calculated as follows:
  (1) when the atomic point $k_i$ is not nitrogen, or the atomic point $k_j$ is not oxygen, $HB_{k_i k_j} = 0$;
  (2) when the atomic point $k_i$ is nitrogen, and the atomic point $k_j$ is oxygen:
    (a) when $$\hat{d}_{N_{k_i} - H_{k_i} - O_{k_j}} \geq \frac{2}{3}$$

and $$dis_{H_{k_i} - O_{k_j}} \leq 3 \text{Å}, HB_{k_i k_j} = 1;$$

and
    (b) when $$\hat{d}_{N_{k_i} - H_{k_i} - O_{k_j}} < \frac{2}{3}$$

and $$dis_{H_{k_i} - O_{k_j}} > 3 \text{Å}, HB_{k_i k_j} = 0;$$

where $$dis_{H_{k_i} - O_{k_j}}$$

is a distance between a hydrogen atom $H_{k_i}$ and an oxygen atom $k_j$ on a nitrogen atom $k_i$; and an angle calculated according to three-dimensional coordinates of the nitrogen atom $k_i$ and the hydrogen atom $H_{k_i}$ and the oxygen atom $k_j$ on the nitrogen atom $k_i$ after standardized preprocessing is denoted as $$d_{N_{k_i} - H_{k_i} - O_{k_j}},$$

and $$\hat{d}_{N_{k_i} - H_{k_i} - O_{k_j}}$$

is an angle of $$d_{N_{k_i} - H_{k_i} - O_{k_j}}$$

after normalization processing.

8. The method for identifying a protein domain based on the protein three-dimensional structure image according to claim 1, wherein a protein domain identification result predicted by the point cloud segmentation model is corrected, and a correction condition comprises: atomic points of a same amino acid belonging to a same protein domain category, when an atomic point of a previous amino acid and an atomic point of a next amino acid for a certain atomic point belong to a same protein domain category, certain atomic point belongs to the same protein domain category, and when a quantity of atomic points belonging to a certain protein domain category in a certain protein three-dimensional structure image is less than a threshold value, further manual correction is required.

9. A system for identifying a protein domain based on the protein three-dimensional structure image, comprising:
  a data acquisition and preprocessing module configured to obtain protein information, protein domain annotation information, a protein three-dimensional experimental structure, a protein three-dimensional computational structure and protein secondary structure annotation information, so as to generate a training set and a target set,
    wherein generating the training set comprises: extracting three-dimensional coordinates of carbon, nitrogen and oxygen atoms in a main chain from the protein three-dimensional experimental structure to construct three-dimensional atomic point cloud, giving, after standardized preprocessing, each atomic point a semantic label of a protein domain to which each atomic point belongs, and forming a first protein three-dimensional structure image as the training set; and
    wherein generating the target set comprises: extracting three-dimensional coordinates of carbon, nitrogen and oxygen atoms in a main chain from the protein three-dimensional computational structure to construct three-dimensional atomic point cloud, and forming, after standardized preprocessing, a second protein three-dimensional structure image as the target set;

a model constructing module, configured to construct a point cloud segmentation model, and comprising:

constructing, by the atomic points in the first and second protein three-dimensional structure images, a local directed graph according to a K-nearest neighbor classification algorithm; and constructing the point cloud segmentation model based on a dynamic graph convolutional neural network according to the local directed graph;

wherein the point cloud segmentation model comprises a local feature extraction layer, a global feature extraction layer and a segmentation layer; the first and second protein three-dimensional structure images are inputted into the point cloud segmentation model after feature extraction, local features are extracted through the local feature extraction layer, global features are extracted through the global feature extraction layer, and the local features and the global features are integrated through the segmentation layer to output a score of a protein domain category label of each atomic point;

wherein the local feature extraction layer comprises a plurality of edge-connected convolutional layers which are sequentially connected, a local directed graph feature of each atomic point is input into each of the plurality of edge-connected convolutional layer, and each edge-connected convolutional layer outputs the local feature of each atomic point after an edge-connected convolutional operation; an output of the previous edge-connected convolutional layer is taken as an input of the next edge-connected convolutional layer;

wherein the global feature extraction layer comprises a multi-layer perceptron and a pooling layer, the local features of the atomic points outputted by all edge-connected convolutional layers in the local feature extraction layer are integrated as an input of the multi-layer perceptron, a local feature set of the atomic point cloud is outputted, and then the global features are outputted after a global pooling operation of the pooling layer; and wherein the segmentation layer comprises a plurality of multi-layer perceptron and a softmax regression layer, the local features of the atomic points outputted by all edge-connected convolutional layers in the local feature extraction layer and the global features outputted by the global feature extraction layer are integrated as an input, and a score of the protein domain category label of each atomic point is generated after operations of the plurality of multi-layer perceptron and the softmax regression layer;

a model training module configured to extract features of the first protein three-dimensional structure image in the training set and train the point cloud segmentation model; and a model prediction module configured to identify a protein domain of the target set after feature extraction by using the trained point cloud segmentation model.

* * * * *